US007746312B2

(12) United States Patent
Lee et al.

(10) Patent No.: US 7,746,312 B2
(45) Date of Patent: Jun. 29, 2010

(54) CIRCUIT FOR GENERATING DRIVING VOLTAGES AND LIQUID CRYSTAL DISPLAY USING THE SAME

(75) Inventors: Eun-Sang Lee, Seoul (KR); Kwang-Sae Lee, Seoul (KR); Won-Seok Ma, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 709 days.

(21) Appl. No.: 11/624,920

(22) Filed: Jan. 19, 2007

(65) Prior Publication Data

US 2007/0120802 A1 May 31, 2007

Related U.S. Application Data

(63) Continuation of application No. 10/659,076, filed on Sep. 10, 2003, now Pat. No. 7,184,011.

(30) Foreign Application Priority Data

Sep. 12, 2002 (KR) .......................... 2002-0055349

(51) Int. Cl.
*G09G 3/36* (2006.01)
*G06F 3/038* (2006.01)
*G09G 5/00* (2006.01)

(52) U.S. Cl. ........................................ 345/99; 345/213

(58) Field of Classification Search ................. 345/204, 345/211-213, 87-104, 99
See application file for complete search history.

(56) References Cited

U.S. PATENT DOCUMENTS 4,137,523 A 1/1979 Mukaiyama
4,278,974 A 7/1981 Kondo
4,872,002 A 10/1989 Stewart et al.
6,326,959 B1 12/2001 Tanaka
6,456,268 B1 * 9/2002 Takeda ........................ 345/92
6,529,181 B2 3/2003 Nakano et al.
6,611,247 B1 8/2003 Chang et al.
6,628,252 B2 9/2003 Hoshino et al.

(Continued)

FOREIGN PATENT DOCUMENTS

CN 1159043 9/1997

(Continued)

OTHER PUBLICATIONS

International Search Report for Application No. PCT/KR03/00034; Mail Date Jun. 19, 2003.

*Primary Examiner*—Bipin Shalwala
*Assistant Examiner*—Ilana Spar
(74) *Attorney, Agent, or Firm*—Cantor Colburn LLP

(57) ABSTRACT

A liquid crystal display is provided, which includes: a liquid crystal panel including a plurality of gate lines, a plurality of data lines, and a plurality of pixels including switching elements connected to the gate lines and the data lines, liquid crystal capacitors and storage capacitors connected to the switching elements; a gate driver for supplying gate voltages for driving the switching elements to the gate lines; a data driver for supplying gray voltages corresponding to applied data signals to the data lines; and a driving voltage generator for boosting a voltage according to a booster clock signal and for generating the gate voltages and a common voltage based on the boosted voltage, and the booster clock signal is synchronized with the common voltage.

9 Claims, 7 Drawing Sheets

U.S. PATENT DOCUMENTS

| | | | | |
|---|---|---|---|---|
| 6,720,943 | B1 | 4/2004 | Kim et al. | |
| 6,898,096 | B2 * | 5/2005 | Endo et al. | 363/147 |
| 6,950,080 | B2 * | 9/2005 | Senda et al. | 345/55 |
| 6,538,633 | B1 | 1/2007 | Ito | |
| 7,184,011 | B2 * | 2/2007 | Lee et al. | 345/99 |
| 2003/0122814 | A1 * | 7/2003 | Yer | 345/211 |

FOREIGN PATENT DOCUMENTS

| | | |
|---|---|---|
| CN | 1220406 | 6/1999 |
| JP | 08005987 | 1/1996 |
| JP | 10111489 | 4/1998 |
| JP | 10339885 | 12/1998 |
| JP | 2000166220 | 6/2000 |
| JP | 2001337638 | 12/2001 |
| JP | 2002062858 | 2/2002 |
| JP | 2002132228 | 5/2002 |
| JP | 2002153046 | 5/2002 |
| JP | 2002175034 | 6/2002 |
| KR | 19900016936 | 11/1990 |
| KR | 19930006612 | 4/1993 |
| KR | 1020020091689 | 12/2002 |

* cited by examiner

CIRCUIT FOR GENERATING DRIVING VOLTAGES AND LIQUID CRYSTAL DISPLAY USING THE SAME

CROSS REFERENCE TO RELATED APPLICATIONS

This application is a continuation application of U.S. application Ser. No. 10/659,076 filed Sep. 10, 2003, which claims priority to and the benefit of Korean Patent Application No. 2002-0055349, filed on Sep. 12, 2002, all of which are incorporated herein in their entirety.

BACKGROUND OF THE INVENTION (a) Field of the Invention

The present invention relates to a liquid crystal display, and more particularly, to a driving voltage generation circuit and a liquid crystal display using the same.

(b) Description of Related Art

A conventional liquid crystal display ("LCD") includes two display panels and a liquid crystal layer having dielectric anisotropy, which is interposed between the two display panels. The LCD obtains intended image by applying electric field and controlling the intensity of the electric field to adjust the transmittance of light passing through the liquid crystal layer. The LCD is representative for portable flat panel displays ("FPDs"), and the most popular one among those LCDs is a TFT-LCD using a thin film transistor ("TFT") as a switching element.

On a display panel on which TFTs are formed, a plurality of gate lines and data lines are formed in horizontal and vertical directions, respectively, and pixel electrodes connected to those gate lines and data lines via the TFTs are formed.

To apply image data to each pixel in such TFT-LCD, a timing controller receives image data from an image signal source (for example, computer, TV, etc.) and outputs image data to a data driver IC while outputting a driving signal to a gate driver IC in time to a prescribed timing. The gate driver IC applies a gate-on voltage, which is a scan signal, to a gate line to make the TFTs connected to the gate line turn on in order, and the data driver IC simultaneously supplies an analog signal (more specifically, a gray voltage) corresponding to the image data to each data line for the pixel line corresponding to the gate line. Then, the image signal provided to the data line is applied to each pixel via the TFT turned on. At this time, image data are applied to all pixel lines by applying gate-on voltage to all gate lines in order during one frame period to display the image of one frame.

Methods for maintaining the data voltage applied to each pixel in such LCD include an independent driving method and a previous gate driving method. The independent driving method is a method to charge the storage capacitance formed in each pixel based on the difference between the pixel voltage applied to the pixel electrode and the common voltage Vcom. The previous gate driving method is a method to charge the storage capacitance based on voltage difference between the pixel voltage applied to the pixel electrode and the gate voltage.

The previous gate driving method has advantages that amount of capacitance is larger than that of the independent driving method and that the pixel aperture ratio is larger than that of the independent driving method because separate wiring for charging storage capacitance is not required due to its panel structure. However, since the gate voltage as well as the pixel voltage and common voltage influences to the image display in the previous gate driving method, it is difficult to control the gamma curve. In addition, flicker is occurred according to the gate voltage delay due to the RC delay on the gate wiring. Moreover, the display quality becomes deteriorated due to the noise included in the voltage supplied to each pixel.

SUMMARY OF THE INVENTION

Therefore, a motivation of the present invention is to resolve the problems of the conventional art and to improve image quality of the liquid crystal display operated based on previous gate driving method.

Especially, a motivation of the present invention is to remove noise generated due to frequency interference between signals.

To achieve these and other objects, a driving voltage generator circuit for a liquid crystal display according to the present invention comprises: a booster for boosting a voltage according to a first applied clock signal and outputting it; a common voltage generator for generating a common voltage based on the boosted voltage according to a second applied clock signal; and a gate voltage generator for generating gate voltages including a gate-on voltage and a gate-off voltage based on the boosted voltage according to the second clock signal, and the first clock signal is synchronized with the common voltage. In this case, it is preferable that the first and second clock signals are synchronized with an externally applied horizontal synchronization signal.

A liquid crystal display according to another aspect of the present invention comprises: a liquid crystal panel including a plurality of gate lines and data lines formed in row and column directions, respectively, and a plurality of pixels each of which has a switching element connected to the gate line and data line on the area defined by the crossing of the gate lines and data lines, each pixel further comprising a liquid crystal capacitor and a storage capacitor connected to the switching element, the liquid crystal capacitor being connected to the output terminal of the switching element and the common voltage, and the storage capacitor being connected to the output terminal of the switching element and the previous gate line; a gate driver for supplying a gate voltage for driving the switching element to the gate line; a data driver for supplying a corresponding gray voltage according to an applied data signal to the data line; and a driving voltage generator for boosting a voltage according to a booster clock signal and for generating the gate voltage and a common voltage based on the boosted voltage, and the booster clock signal is synchronized with the common voltage.

Additionally, the liquid crystal display of the present invention may further comprise a timing controller including: a first clock generator for generating a first clock signal by frequency division of a voltage from an external device; and a second clock generator for generating a second clock signal synchronized with a horizontal synchronization signal from an external device.

In this case, the driving voltage generator may include: a selector for selecting one from the first clock signal and the second clock signal and outputting the selected signal as a booster clock signal; a booster for boosting a voltage according to the booster clock signal and outputting it; a common voltage generator for generating a common voltage based on the boosted voltage based on the second clock signal; and a gate voltage generator for generating gate voltages including a gate-on voltage and a gate-off voltage based on the boosted voltage according to the second clock signal, and it is preferable that the selector selects the second clock signal as the booster clock signal.

On the other hand, the liquid crystal display according to the aspects of the present invention can further comprise a timing controller including: a first clock generator for generating a first clock signal synchronized with a horizontal synchronization signal from an external device; and a second clock generator for generating a first clock signal synchronized with a horizontal synchronization signal from an external device.

In this case, the driving voltage generator includes: a booster for boosting a voltage according to the first clock signal and outputting it; a common voltage generator for generating a common voltage based on the boosted voltage according to the second clock signal; and a gate voltage generator for generating gate voltages including a gate-on voltage and a gate-off voltage based on the boosted voltage according to the second clock signal.

On the other hand, the driving voltage generator according to the above aspects may further include a data driving voltage generator for generating a data driving voltage for generating the gray voltage based on the boosted voltage.

DETAILED DESCRIPTION OF PREFERRED EMBODIMENTS

The present invention now will be described in more detail hereinafter with reference to the accompanying drawings, in which preferred embodiments of the invention are shown. However, this invention may be embodied in many different forms and should not be construed as limited to the embodiments set forth herein.

Figure 1:
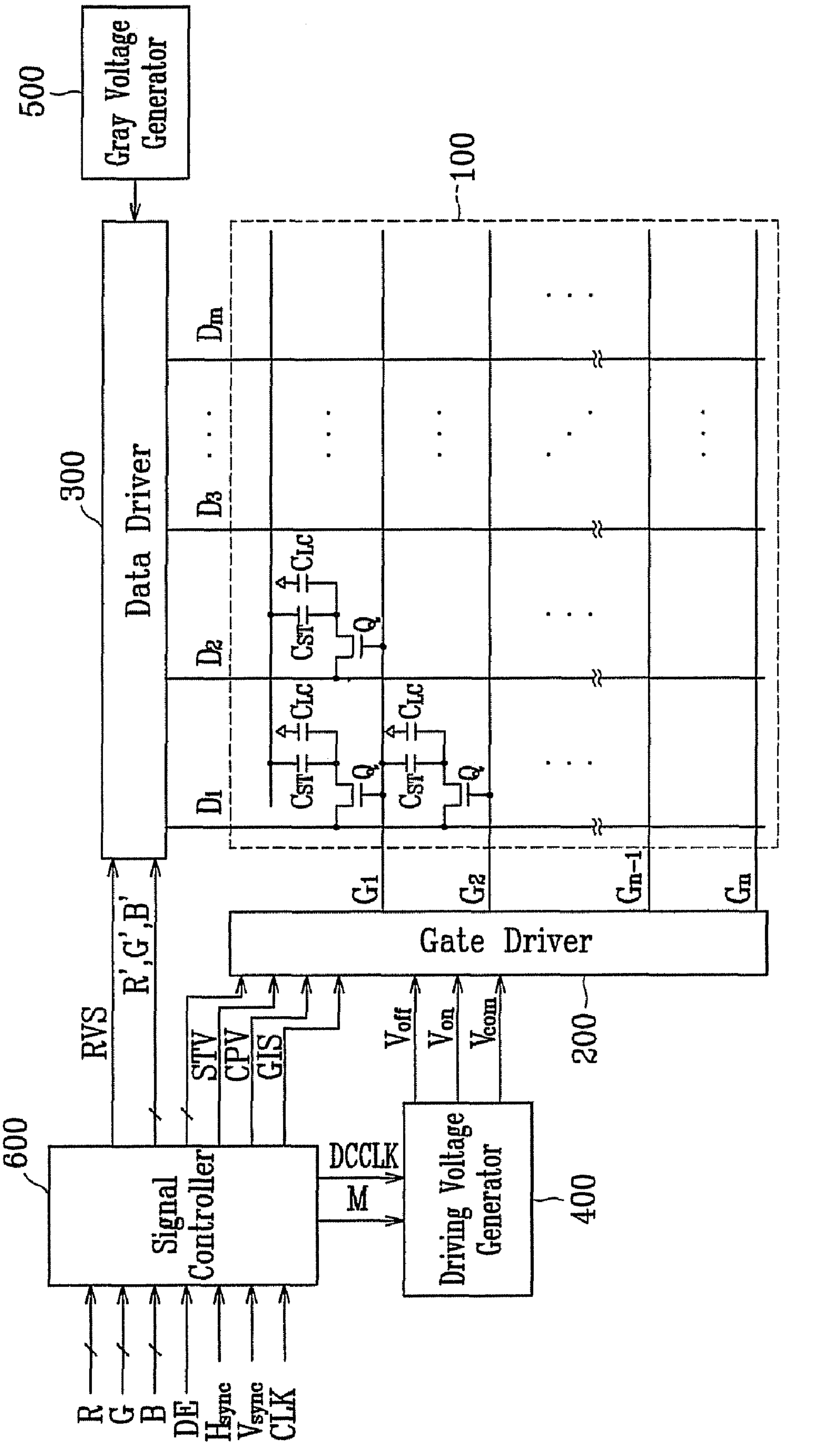
FIG. 1 is a block diagram of an LCD according to an embodiment of the present invention.
Figure 2:
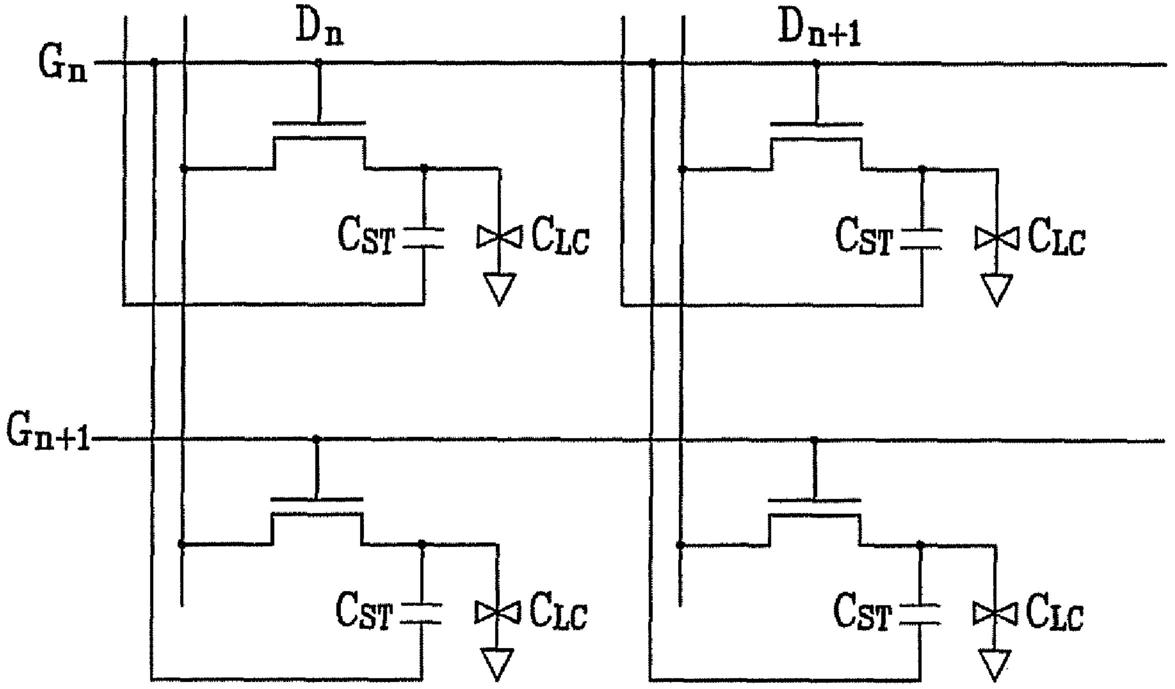
FIG. 2 is an equivalent circuit diagram of a pixel according to an embodiment of the present invention.

FIG. 1 shows a structure of an LCD according to an embodiment of the present invention, and FIG. 2 shows a structure of the pixel shown in FIG. 1 in more detail.

As shown in FIG. 1, the LCD according to an embodiment of the present invention includes a liquid crystal panel 100, a gate driver 200 and a data driver 300 connected thereto, a driving voltage generator 400 connected to the gate driver 200, a gray voltage generator 500 connected to the data driver 300, and a timing controller 600 for controlling these elements.

In the viewpoint of an equivalent circuit, the liquid crystal display includes, as shown in FIGS. 1 and 2, a plurality of signal lines G1-Gn and D1-Dm and a plurality of pixels connected thereto, and each pixel includes a switching element Q connected to the signal lines G1-Gn and D1-Dm and a liquid crystal capacitor Clc and a storage capacitor Cst both of which are connected to the switching element Q. The signal lines G1-Gn and D1-Dm include a plurality of gate lines (or scanning signal lines) G1-Gn extended in row direction for transmitting scanning signals or gate signals, and a plurality of data lines D1-Dm extended in column direction for transmitting image signals or data signals. The switching element Q is a tri-terminal element having a control terminal connected to the gate line G1-Gn, an input terminal connected to the data line D1-Dm, and an output terminal connected to one terminal of the liquid crystal capacitor Clc and one terminal of the storage capacitor Cst.

Especially, since the LCD according to an embodiment of the present invention is a previous gate driving type, as shown in FIG. 2, the liquid crystal capacitor Clc is connected to the output terminal of the switching element Q and the common voltage Vcom (or it can be called as reference voltage). The other terminal of the storage capacitor Cst is connected to a gate line placed just above (hereinafter "previous gate line").

In the liquid crystal panel having such structure, if a gate-on voltage Von is applied to the present gate line Gn and the switching element is turned on, the gray voltage supplied to the data line is applied to the pixel electrode via the switching element Q. Then, electric field corresponding to the difference between the pixel voltage applied to the pixel electrode and the common voltage Vcom is applied to the liquid crystal (it is shown as the liquid crystal capacitor Clc as an equivalent circuit in FIGS. 1 and 2) to make light transmitted in a transmittance corresponding to the intensity of the electric field. At this time, a voltage corresponding to the difference between a gate-off voltage applied to the previous gate line Gn−1 and the pixel voltage applied to the pixel electrode is charged to the storage capacitor Cst, and it is used auxiliary to maintain the pixel voltage for one frame period according to the driving of the present gate line.

On the other hand, the driving voltage generator 400 generates a gate-on voltage Von which turns on the switching element Q, a gate-off voltage Voff which turns off the switching element Q, the common voltage Vcom, and a data driving voltage $V_{DH}$ for generating gamma voltage. Especially, according to an embodiment of the present invention, appropriate voltage is generated and supplied to the gate driver 200 and the gray voltage generator 500 to prevent noise generation.

The gray voltage generator 500 generates a gray voltage based on the data driving voltage $V_{DH}$ from the driving voltage generator 400 and provides it to the data driver 300.

The gate driver 200 is also called as the scan driver and connected to the gate lines G1 through Gn of the liquid crystal panel 100, and it applies a gate signal made of a combination of the gate-on voltage Von and the gate-off voltage Voff from the driving voltage generator to the gate lines G1 through Gn.

The data driver 300 is also called as the source driver and connected to the data lines D1 through Dm of the liquid crystal panel assembly 300, and it selects a gray voltage from the gray voltage generator 500 and applies it to the data lines D1 through Dm as a data signal.

The timing controller 600 generates control signals for controlling the operation of the gate driver 200, the data driver 300, the driving voltage generator 400, etc. and supplies appropriate control signal to the gate driver 200, the data driver 300, and the driving voltage generator 400.

The control signal outputted from the timing controller 600 to the gate driver 200 includes a vertical start signal STV for commanding the start of the appliance of the gate-on voltage to apply the gate-on voltage to the gate line, a gate clock signal CPV to apply the gate-on voltage to each gate line in order, and a gate-on enable signal OE to enable the output of the gate driver 200, and so forth.

The control signals outputted from the timing controller 600 to the data driver 300 includes a horizontal start signal Hstart for commanding to input the digital data signal [R(0:N), G(0:N), B(0:N)] received from an external image source (for example, graphic controller, etc.) to the data driver 300, a signal for commanding the appliance of the data signal transformed to the analog signal in the data driver 300 to the panel (hereinafter "LOAD" signal), a horizontal clock signal HCLK for data shift in the data driver 300, and so forth.

Also, the control signals outputted from the timing controller 600 to the driving voltage generator 400 includes the first clock signal DCCLK for boosting, the second clock signal for generating the gate-on voltage Von and the gate-off voltage Voff and the common voltage Vcom, and so forth.

First, the driving voltage generator for generating a plurality of voltages based on the first and second clock signals applied from the timing controller in the LCD having such a configuration will be described in detail.

Figure 3:
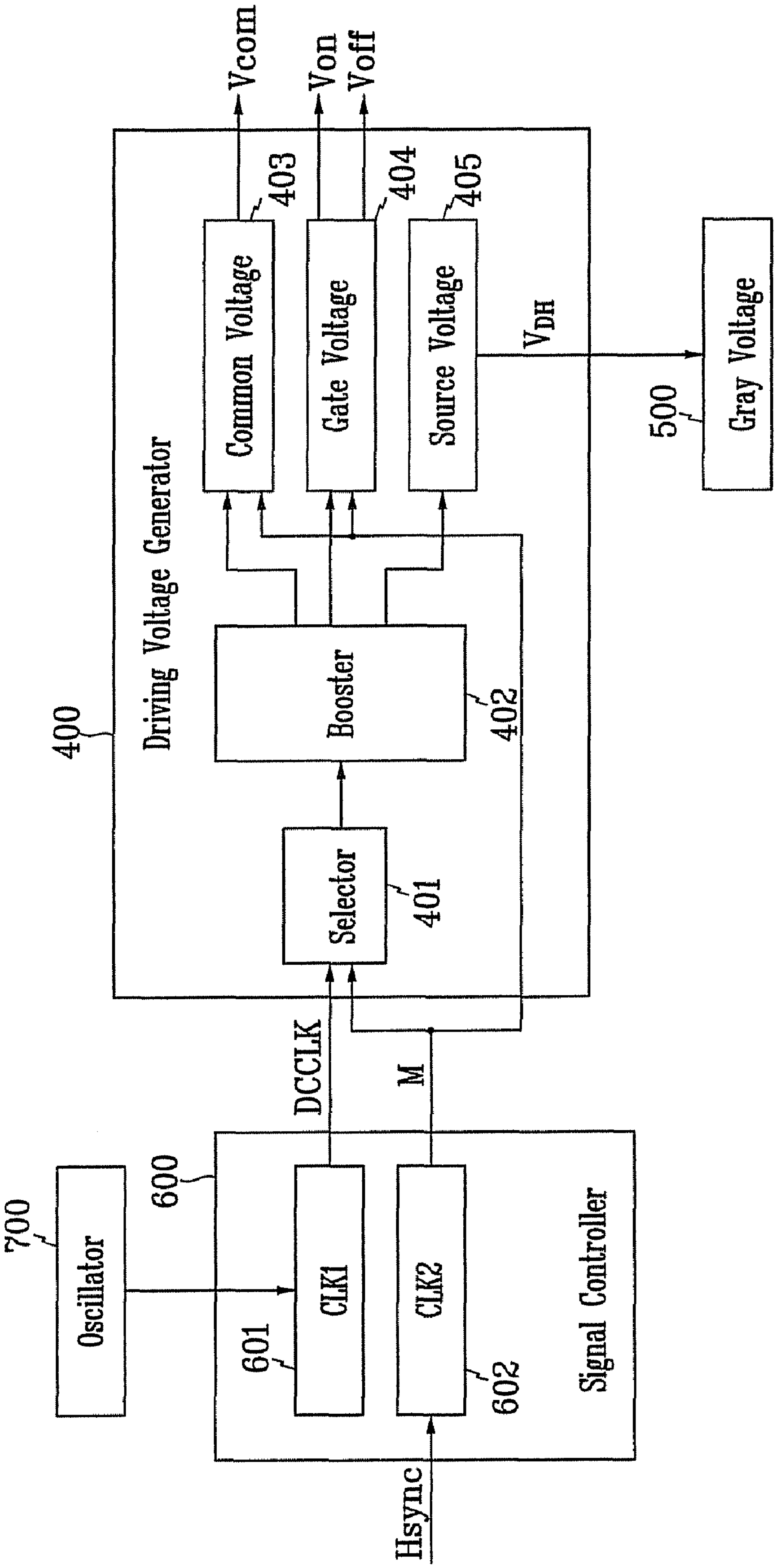
FIG. 3 is a block diagram of a driving voltage generator according to the first embodiment of the present invention.

FIG. 3 shows a configuration of a driving voltage generator according to a first embodiment of the present invention.

As shown in FIG. 3, a driving voltage generator 400 according to the first embodiment of the present invention includes a selector 401 for selecting one from a first clock signal DCCLK and a second clock signal M applied from the timing controller 600 and outputting the selected signal, a booster 402 for boosting a voltage according to the selected clock signal and outputting the boosted voltage, a common voltage generator 403 for generating a common voltage Vcom based on the boosted voltage, a gate voltage generator 404 for generating a gate-on voltage and a gate-off voltage based on the boosted voltage, and a data driving voltage generator 405 for generating a data driving voltage $V_{DH}$ for generating gray voltages based on the boosted voltage. Here, the booster 402 boosts the applied voltage using a charge pumping technique, but the scope of the present invention is not confined to the use of a specific method. Detailed description about the charge pumping is omitted here because it is already a well-known art.

The timing controller 600 connected to the driving voltage generator 400 includes a first clock generator 601 for generating the first clock signal DCCLK and a second clock generator 602 for supplying the second clock signal M, and an oscillator 700 is connected to the first clock generator 601. The timing generator 600 has not only the above listed elements, but further has a plurality of elements for processing and generating various control signals for driving the LCD and for processing inputted image data, and so forth. The functions and elements for performing such functions are already known; therefore detailed description is omitted here.

Figure 4:
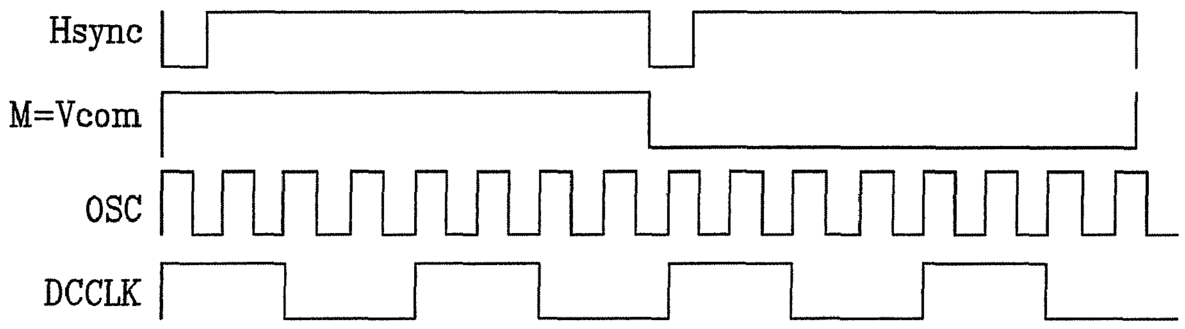
FIG. 4 is a waveform diagram of signals used in a driving voltage generator according to the first embodiment of the present invention.

The first clock generator 601 of the timing controller 600 performs frequency division of an oscillating voltage provided from the oscillator 700 and generates the first clock signal DCCLK, and the second clock generator 602 generates the second clock signal M synchronized with a horizontal synchronization signal Hsync applied from an external image source that is not shown in the figures. FIG. 4 shows waveform of each signal.

The first and the second clock signals DCCLK and M generated as described above are provided to the driving voltage generator 400, the first clock signal DCCLK is used as a signal for voltage boosting of the booster 402 (booster clock signal), and the second clock signal M is used as a signal for common voltage generation of the common voltage generator 403.

On the other hand, since the frequency of the first clock signal DCCLK and the display frequency are different from each other, interference occurs between them.

More specifically, as shown in FIG. 4, while the first clock signal DCCLK is a signal which is frequency-divided from the output voltage of the oscillator 700, the second clock signal M is a signal synchronized with the horizontal synchronization signal Hsync. Therefore, frequencies and phases of the first clock signal DCCLK and the second clock signal M are different from each other. Since the common voltage Vcom is generated according to the second clock signal M, frequencies and phases of the first clock signal DCCLK and the common voltage Vcom are different from each other in consequence.

Generally, if frequencies and phases of two signals are different from each other, frequency interference is generated between the two signals. More specifically, there can be four possible relations between two signals: (a) both frequencies and phases are same; (b) frequencies are different and phases are same; (c) frequencies are same and phases are different; and (d) both frequencies and phases are different. The ideal relation is (a), and no noise is generated in this case. In case of (b), since phases are same, wave noise is not generated, but noise such as flicker is generated. In case of (c), wave noise in the form of low frequency is generated. However, in case of (d), since both frequencies and phases are different, wave noise is generated severely and it has the form of high frequency rather than low frequency.

Therefore, since the common voltage Vcom which swings in a constant period for line inversion and the first clock signal DCCLK according to an embodiment of the present invention are different from each other both in frequencies and phases, noises of high frequency component such as wave noise are generated in the common voltage Vcom. In addition, since the gate voltage generator 404 generates the gate voltages according to the second clock signal, frequencies and phases of the first clock signal DCCLK and the gate voltages become different to generate noise of high frequency component in the gate voltages.

Figure 5:
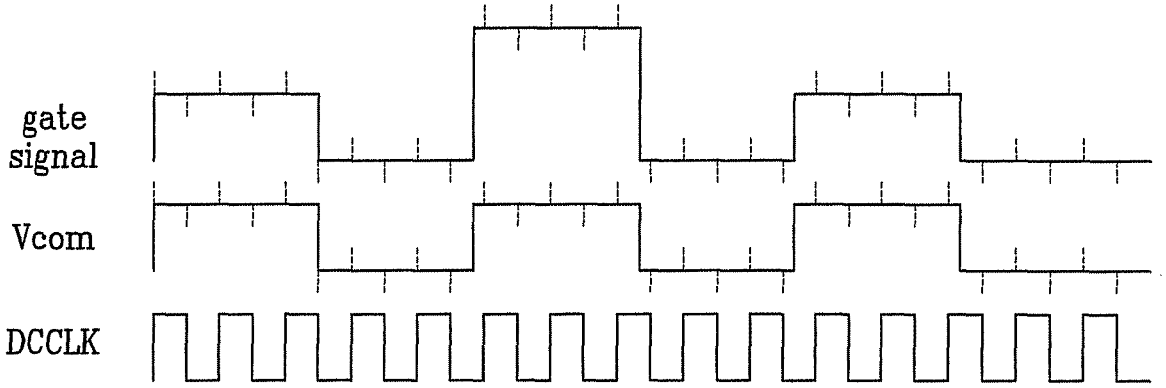
FIG. 5 shows an example case in which noise is generated due to frequency interference between signals shown in FIG. 4.

FIG. 5 shows waveforms of each voltage indicating the status that noise is generated due to frequency interference.

Since the LCD according to an embodiment of the present invention uses previous gate driving method, the previous gate line is connected to the storage capacitor Cst of the present pixel. Therefore, as shown in FIG. 5, if the common voltage and gate voltage contain noises of high frequency, it influences to the storage capacitor Cst when displaying an image to make the quality of the displayed image worse seriously.

Therefore, to remove such noises, according to the present invention, the first clock signal DCCLK and the second clock signal M are inputted to the selector 401 of the driving voltage generator 400 as inputs and the second clock signal M is selected to be provided to the booster 402 instead that the selector 401 of the driving voltage generator 400 provides the first clock signal DCCLK to the booster 402 in the embodiment of the present invention. That is, the clock signal for generating the common voltage and gate voltage is selected as the booster clock signal.

Accordingly, the booster 402 boosts the voltage and outputs it according to the second clock signal M, and the common voltage generator 403 generates the common voltage Vcom based on the booster voltage applied according to the second clock signal M. As a result, the clock signals for boosting and the common voltage are synchronized with each other; therefore, the above-described frequency interference is not generated. Moreover, it is possible that the gate voltage generator 404 generates the gate voltages based on the booster voltage applied according to the second clock signal M to make the gate voltages not to contain noise.

Since frequency interference between signals which influence to each other is not generated, noise is not generated and image deterioration can be prevented.

On the other hand, frequency interference can be prevented without using the selector different from the above-described first embodiment.

Figure 6:
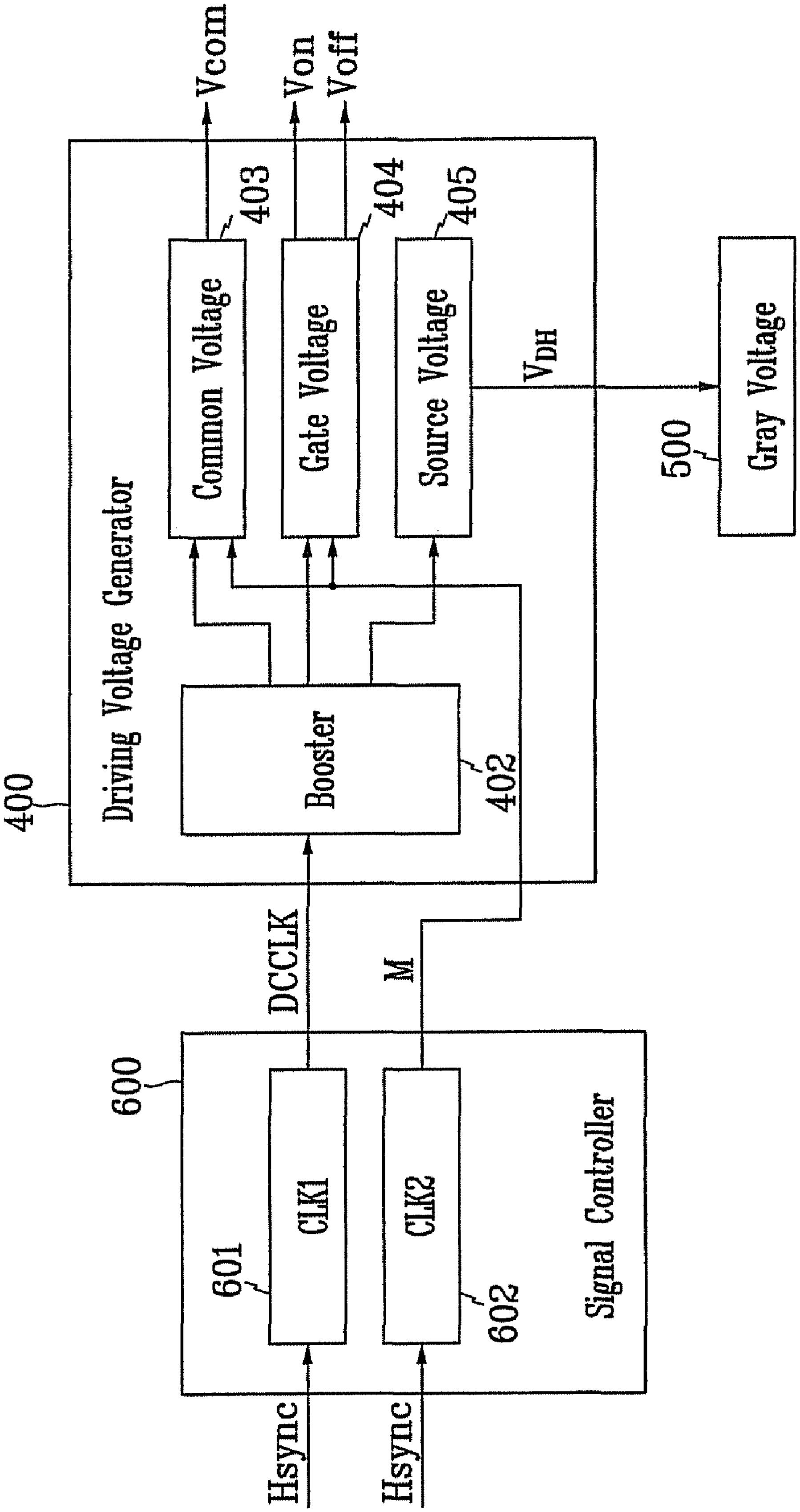
FIG. 6 is a structure diagram of a driving voltage generator according to the second embodiment of the present invention.

FIG. 6 shows the structure of a driving voltage generator according to a second embodiment of the present invention. Here, the same reference numerals are given to the elements performing the same functions as those in the first embodiment, and detailed description about those elements will be omitted.

As shown in FIG. 6, a driving voltage generator 400 according to the second embodiment of the present invention includes a booster 402 for boosting a voltage and outputting it according to a first clock signal DCCLK applied from a timing controller 600, a common voltage generator 403 for generating a common voltage Vcom base on the boosted voltage according to an applied second clock signal M, a gate voltage generator 404 for generating a gate-on voltage Von and a gate-off voltage Voff, and a data driving voltage generator 405 for generating a data driving voltage $V_{DH}$.

Like the first embodiment, the timing controller 600 which provides the first and the second clock signals to the driving voltage generator 400 includes a first clock generator 601 and a second clock generator 602, but the first clock generator 601 is not connected to any oscillator.

Now, the operation of the driving voltage generator according to the second embodiment of the present invention having the above-described configuration is described.

The first clock generator 601 of the timing controller 600 generates the first clock signal DCCLK, and the second clock generator 602 generates the second clock M, in synchronization with a horizontal synchronization signal Hsync applied from an external image source not shown in the figure. That is, as described in the explanation of the first embodiment, since interference is generated due to the differences of frequencies and phases of the first clock signal DCCLK and the common voltage Vcom, the first clock generator 601 generates the first clock signal DCCLK synchronized with the horizontal synchronization signal Hsync to make the first clock signal DCCLK synchronized with the common voltage in the timing controller 600 of the second embodiment of the present invention. Therefore, the first clock signal DCCLK and the second clock signal M are synchronized with each other.

The first and second clock signals DCCLK and M, which are synchronized with each other, are provided to the driving voltage generator 400, the first clock signal DCCLK is inputted to the booster 402, and the second clock signal M is inputted to the common voltage generator 403 and the gate voltage generator 404, respectively.

The common voltage generator 403 generates the common voltage Vcom based on the boosted voltage applied according to the second clock signal M. In result, the clock signal for boosting and the common voltage Vcom are synchronized with each other such that the above-described frequency interference is not generated. On the other hand, the gate voltage generator 404 generates the gate-on voltage Von and the gate-off voltage Voff according to the second clock signal M and provides them to the gate driver 200.

Figure 7:
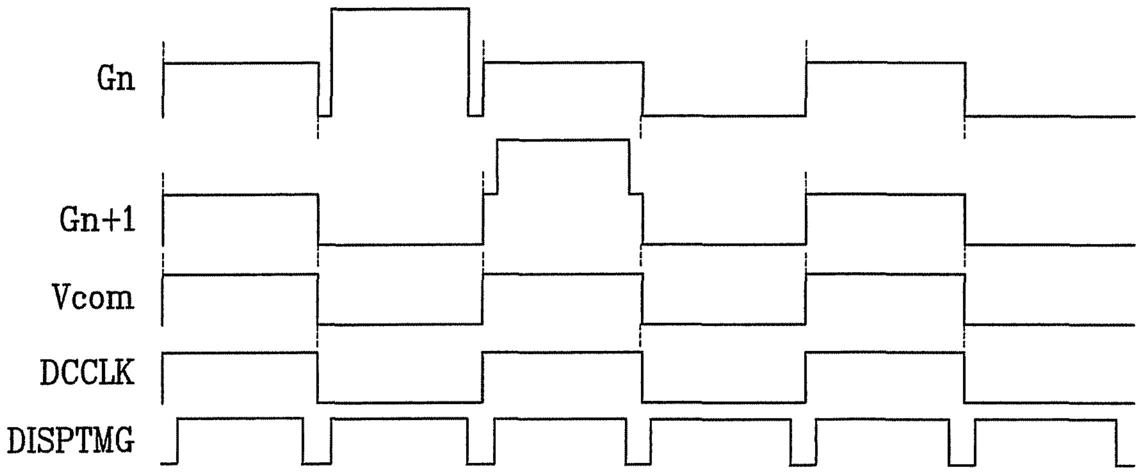
FIG. 7 is an operational waveform diagram of a driving voltage generator according to the second embodiment of the present invention.

FIG. 7 shows waveforms of the signals according to the second embodiment of the present invention. As shown in FIG. 7, according to the embodiment of the present invention, periods and phases of the first clock signal DCCLK and the common voltage Vcom are same. At this time, high frequency component influences to the gate signals and the common voltage at the rising edge and the falling edge of the first clock signal DCCLK. However, high frequency noise is not generated substantially in the gate voltage and the common voltage Vcom in the section DISPTMG when the image is displayed by application of the data voltage and gate-on voltage to each pixel, but in the low part of the above section DISTIMG. Therefore, although noise is generated, it does not influence image display.

The common voltage Vcom and the gate-on voltage Von and gate-off voltage Voff generated by the driving voltage generator 400 which synchronize the first clock signal DCCLK for voltage boosting with the common voltage Vcom according to the above-described first and second embodiments are provided to the gate driver 200, and RGB data processed in the timing controller 600 are provided to the data driver 300.

The data driver 300 converts the applied RGB image data applied in synchronization with a horizontal start signal Hstart into corresponding gray voltages, respectively, and applies them to the source electrodes of the switching elements of the liquid crystal panel 100, i.e., the TFTs according to the applied load signal. The gate driver 200 applies the gate-on voltage Von to the gate electrodes of the TFTs in synchronization with a gate clock signal CPV outputted from the timing controller 600. In result, the data voltages applied to the source electrodes are charged to the pixel electrodes.

Therefore, orientation of the liquid crystal changes according to the voltage difference between the data voltage supplied to each pixel electrode and the common voltage, and accordingly the transmittance of light changes to display the intended image.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

As described above, according to the present invention, interference generated due to the difference between the frequency of the signal for generating driving voltage and the display frequency is removed to prevent image deterioration due to noise generation in the LCD of previous gate driving method. Accordingly, image quality of the LCD is improved.

What is claimed is:

1. A driving voltage generator circuit for a liquid crystal display comprising:

a booster for boosting a voltage according to a first clock signal and outputting the boosted voltage;

a common voltage generator for generating a common voltage based on the boosted voltage and according to a second clock signal; and a selector for selecting one from a clock signal generated by frequency division of a voltage from an external device and the second clock signal and for outputting the selected signal as the first clock signal, wherein the first clock signal is synchronized with the common voltage.

2. The driving voltage generator circuit of claim 1, further comprising a gate voltage generator for generating gate voltages including a gate-on voltage and a gate-off voltage.

3. The driving voltage generator circuit of claim 2, wherein the gate voltage generator generates the gate voltages based on the boosted voltage according to the second clock signal.

4. The driving voltage generator circuit of claim 1, wherein the first and second clock signals are synchronized with a horizontal synchronization signal from an external device.

5. A liquid crystal display having a plurality of switching elements, comprising:

a booster for boosting a voltage according to a first clock signal and outputting the boosted voltage;

a common voltage generator for generating a common voltage based on the boosted voltage according to a second clock signal;

a gate voltage generator for generating gate voltages including a gate-on voltage and a gate-off voltage based on the boosted voltage according to the second clock signal;

a data driving voltage generator for generating a data driving voltage for generating gray voltages based on the boosted voltage;

a gate driver for supplying the gate voltages for driving the switching elements; and a data driver for supplying the gray voltages corresponding to applied data signals to the switching elements, wherein the first clock signal is synchronized with the common voltage.

6. The liquid crystal display of claim 5, further comprising a timing controller including a first clock generator for generating a clock signal by frequency division of a voltage from an external device, and a second clock generator for generating the second clock signal synchronized with a horizontal synchronization signal from an external device.

7. The liquid crystal display of claim 6, further comprising a selector for selecting one from the clock signal and the second clock signal and outputting the selected signal as the first clock signal.

8. The liquid crystal display of claim 7, wherein the selector selects the second clock signal.

9. The liquid crystal display of claim 6, wherein the clock signal generated by the first clock generator is synchronized with a horizontal synchronization signal from the external device.

* * * * *